(12) United States Patent
Fisher et al.

(10) Patent No.: US 11,649,878 B2
(45) Date of Patent: May 16, 2023

(54) CLAMPING DEVICE (71) Applicant: GRIPPLE LIMITED, Sheffield (GB)

(72) Inventors: Thomas Edward Fisher, Sheffield (GB); Lee Giemza, Wakefield (GB)

(73) Assignee: GRIPPLE LIMITED

( * ) Notice: Subject to any disclaimer, the term of this patent is extended or adjusted under 35 U.S.C. 154(b) by 242 days.

(21) Appl. No.: 16/955,353

(22) PCT Filed: Jan. 29, 2019

(86) PCT No.: PCT/GB2019/000013
§ 371 (c)(1),
(2) Date: Jun. 18, 2020

(87) PCT Pub. No.: WO2019/150065
PCT Pub. Date: Aug. 8, 2019

(65) Prior Publication Data
US 2021/0095741 A1  Apr. 1, 2021

(30) Foreign Application Priority Data

Feb. 2, 2018 (GB) ...................................... 1801759
Jan. 28, 2019 (GB) ...................................... 1901150

(51) Int. Cl.
*F16G 11/10* (2006.01)
(52) U.S. Cl.
CPC .......... *F16G 11/106* (2013.01); *F16G 11/108* (2013.01)
(58) Field of Classification Search
CPC .... F16G 11/106; F16G 11/108; F16G 11/101; Y10T 24/3996; Y10T 24/3969; Y10T 24/3976
See application file for complete search history.

(56) References Cited

U.S. PATENT DOCUMENTS 3,628,221 A  12/1971  Pasbrig
3,709,071 A  1/1973  Moransais
(Continued)

FOREIGN PATENT DOCUMENTS

CN  103097766 A  5/2013
CN  103742595 B  5/2016
(Continued)

OTHER PUBLICATIONS

First Examination Report which issued in connection with a corresponding foreign application dated Apr. 26, 2022.
(Continued)

*Primary Examiner* — Robert Sandy
(74) *Attorney, Agent, or Firm* — Clark Hill PLC; James R. Foley (57) ABSTRACT

A clamping device (10) for clamping an elongate article (100) is disclosed. The clamping device (10) includes a body (12) and a clamping arrangement (26) in the body (12). The clamping arrangement (26) includes a clamping member (28) and an urging member (30) for urging the clamping member (2B) into clamping engagement with the elongate article (100). The body (12) has a reaction formation (56) along which the elongate article (100) can extend. The reaction formation (56) applies a reaction force to the elongate article (100) when so engaged by the clamping member (28). The clamping device (10) further includes a carriage (32) on which the clamping member (28) is provided, and a release member (42) on the carriage (32) for releasing the clamping member (28) from engagement with the elongate article (100). The release member (42) extends outwardly from the body (12).

19 Claims, 9 Drawing Sheets

(56) References Cited

U.S. PATENT DOCUMENTS

| | | | |
|---|---|---|---|
| 5,323,514 A | 6/1994 | Masuda | |
| 5,894,639 A | 4/1999 | Boden | |
| 6,058,574 A * | 5/2000 | Facey | F16G 11/106 24/115 R |
| 8,112,847 B2 * | 2/2012 | Shawcross | H01R 4/5083 403/396 |
| 2003/0115723 A1 | 6/2003 | Shuey | |
| 2003/0121126 A1 | 7/2003 | Buscart | |
| 2010/0279540 A1 | 11/2010 | Shawcross et al. | |
| 2011/0041292 A1 | 2/2011 | Jolly | |
| 2012/0110791 A1 * | 5/2012 | Giemza | F16G 11/106 24/136 R |
| 2013/0291341 A1 | 11/2013 | Somerfiled et al. | |
| 2014/0123439 A1 * | 5/2014 | Bacon | F16G 11/106 24/134 KB |
| 2015/0285337 A1 | 10/2015 | Dingley | |

FOREIGN PATENT DOCUMENTS

| | | |
|---|---|---|
| EP | 2607747 A2 | 6/2013 |
| FR | 1373066 A | 9/1964 |
| GB | 2305463 A | 4/1997 |
| GB | 2471773 A | 1/2011 |
| GB | 2483761 A | 3/2012 |
| JP | 2000-505535 A | 5/2000 |
| JP | 2013-537289 A | 9/2013 |
| WO | 97/36123 A1 | 10/1997 |

OTHER PUBLICATIONS

English translation of Japanese Office Action dated Sep. 6, 2022 which issued in connection with a corresponding foreign application.

* cited by examiner

CLAMPING DEVICE

This invention relates to clamping devices. More particularly, but not exclusively, this invention relates to clamping devices for use with elongate articles, such as cables, wire ropes and the like.

Clamping devices for securing elongate articles, in the form of cables or wire ropes, are known. An example of such a clamping device is disclosed in GB2210517. When the device clamps an elongate article, it can be difficult to release it. Attempts have been made to manufacture clamping devices with mechanisms to release the elongate article. GB2471773 discloses a clamping device with such a release mechanism. In the clamping device disclosed in GB2471773, the release member is provided at the opposite end of the device to the clamping member it releases. This has the problem that the body of the device has internal obstructions that can hinder the movement of the release member, or cause damage thereto.

According to a first aspect of this invention, there is provided a clamping device for clamping an elongate article, the clamping device comprising:
a body defining an internal space through which the elongate article can extend;
a clamping mechanism in the internal space, the clamping mechanism comprising a clamping member and an urging member for urging the clamping member into clamping engagement with the elongate article;
the body having a reaction formation along which the elongate article can extend, the reaction formation being for applying a reaction force to the elongate article when so engaged by the clamping member;
the clamping device further includes a release member for releasing the clamping member from engagement with the elongate article; and
wherein the body defines an opening arrangement, the opening arrangement being configured to receive the clamping mechanism and the release member therethrough into the internal space.

Thus, the opening arrangement provides access for the clamping mechanism and the release member into the internal space on assembly of the clamping device.

The provision of the opening arrangement at one of the ends provides the advantage in the embodiment described herein that the release member and the clamping mechanism can be assembled into the body from the same opening in the body. This overcomes the problem associated with the prior art, such as the device disclosed in GB2471773.

The clamping device may include a carriage on which the clamping member is carried. The release member may be attached to the carriage. The release member may extend through the opening arrangement. The release member and the carriage may be a unitary component. The carriage may be received through the opening arrangement when the clamping mechanism is received therethrough.

The opening arrangement may have a main opening region defined by the body, the main opening region being configured to receive the clamping mechanism therethrough into the internal space.

The opening arrangement may have a slot region defined by the body. The release member may extend through the slot region. The release member may be movable along the slot region to allow operation of the release member by a user.

The main opening region and the slot region may communicate with each other to allow the release member to be received in the slot region when the release member is received through the opening arrangement.

The opening arrangement may have an exit opening region through which the elongate article can exit when the elongate article is fed into the internal space. The exit opening region and the main opening region may communicate with each other, so that the main opening region and the exit opening region may together be a single opening.

The body may define a feed opening region through which the elongate article can be fed when the elongate article is fed into the internal space. The feed opening region may be opposite the exit opening region. The body may have opposite ends. The exit opening region and the main opening region may each be defined in a respective one of the opposite ends. The body may have opposite side portions extending from the opposite ends. The slot region may extend along one of the side portions.

According to a second aspect of this invention, there is provided a clamping device for clamping an elongate article, the clamping device comprising:
a body having opposite ends, the body defining an internal space through which the elongate article can extend;
a clamping mechanism in the internal space, the clamping mechanism comprising a clamping member and an urging member for urging the clamping member into clamping engagement with the elongate article;
the body having a reaction formation along which the elongate article can extend, the reaction formation being for applying a reaction force to the elongate article when so engaged by the clamping member;
a carriage on which the clamping member is carried; and
a release member for releasing the clamping member from engagement with the elongate article;
wherein the body defines an opening arrangement configured to receive the clamping mechanism and the release member therethrough into the internal space, the opening arrangement including an elongate slot region along which the release member can move to allow operation of the release member by a user.

Thus, the opening arrangement provides access for the clamping mechanism and the release member into the internal space on assembly of the clamping device.

The release member may be attached to the carriage. The release member and the carriage may be a unitary component. The carriage may be received through the opening arrangement when the clamping mechanism is received therethrough.

The opening arrangement may have a main opening region defined by the body, the main opening region being configured to receive the clamping mechanism therethrough into the internal space.

The main opening region and the slot region may communicate with each other to allow the release member to be received in the slot region when the release member is received through the opening arrangement.

The opening arrangement may have an exit opening region through which the elongate article can exit when the elongate article is fed into the internal space. The exit opening region and the main opening region may communicate with each other, so that the main opening region and the exit opening region may together be a single opening.

The body may define a feed opening region through which the elongate article can be fed when the elongate article is fed into the internal space. The feed opening region may be opposite the exit opening region. The exit opening region and the main opening region may each be defined in a respective one of the opposite ends.

The body may have opposite side portions extending from the opposite ends. The slot region may extend along one of the side portions.

According to third aspect of this invention, there is provided a clamping device for clamping an elongate article, the clamping device comprising:
a body;
a clamping mechanism in the body, the clamping mechanism comprising a clamping member and an urging member for urging the clamping member into clamping engagement with the elongate article;
the body having a reaction formation along which the elongate article can extend, the reaction formation being for applying a reaction force to the elongate article when so engaged by the clamping member;
a carriage on which the clamping member is carried; and
a release member for releasing the clamping member from engagement with the elongate article, the release member extending outwardly from the body.

The body may define an internal space. The body may define an opening arrangement configured to receive the clamping mechanism and the release member therethrough into the internal space.

The release member may be attached to the carriage. The release member and the carriage may be a unitary component. The carriage may be received through the opening arrangement when the clamping mechanism is received therethrough.

The opening arrangement may have a main opening region defined by the body, the main opening region being configured to receive the clamping mechanism therethrough into the internal space.

The opening arrangement may have a slot region defined by the body. The release member may extend through the slot region. The release member may be movable along the slot region to allow operation of the release member by a user.

The main opening region and the slot region may communicate with each other to allow the release member to be received in the slot region when the release member is received through the opening arrangement.

The opening arrangement may have an exit opening region through which the elongate article can exit when the elongate article is fed into the internal space. The exit opening region and the main opening region may communicate with each other, so that the main opening region and the exit opening region may together be a single opening.

The body may define a feed opening region through which the elongate article can be fed when the elongate article is fed into the internal space. The feed opening region may be opposite the exit opening region. The body may have opposite ends. The exit opening region and the main opening region may each be defined in a respective one of the opposite ends. The body may have opposite side portions extending from the opposite ends. The slot region may extend along one of the side portions.

According to a fourth aspect of this invention, there is provided a clamping device for clamping an elongate article, the clamping device comprising:
a body defining an internal space through which the elongate article can extend;
a clamping mechanism in the internal space, the clamping mechanism comprising a clamping member and an urging member for urging the clamping member into clamping engagement with the elongate article;
the body having a reaction formation along which the elongate article can extend, the reaction formation being for applying a reaction force to the elongate article when so engaged by the clamping member;
a release member for releasing the clamping member from engagement with the elongate article;
wherein the body defines an opening arrangement, the opening arrangement being configured to receive the clamping mechanism and the release member therethrough into the internal space.
and wherein the opening arrangement has a slot region and main opening region, the slot region having an open end to provide communication between the slot region and the main opening region, the release member extending outwardly from the body through the slot region.

The clamping device may include a carriage on which the clamping member is carried. The release member may be attached to the carriage. The release member and the carriage may be a unitary component. The carriage may be received through the opening arrangement when the clamping mechanism is received therethrough.

In the embodiment described herein, the carriage provides an advantage that it is an effective means of applying a release force to the clamping member, thereby providing enhanced release compared to prior art clamping devices.

The release member may be movable along the slot region to allow operation of the release member by a user.

The main opening region and the slot region may communicate with each other to allow the release member to be received in the slot region when the release member is received through the opening arrangement.

The opening arrangement may have an exit opening region through which the elongate article can exit when the elongate article is fed into the internal space. The exit opening region and the main opening region may communicate with each other, so that the main opening region and the exit opening region may together be a single opening.

The body may define a feed opening region through which the elongate article can be fed when the elongate article is fed into the internal space. The feed opening region may be opposite the exit opening region. The body may have opposite ends. The exit opening region and the main opening region may each be defined in a respective one of the opposite ends. The body may have opposite side portions extending from the opposite ends. The slot region may extend along one of the side portions.

According to a fifth aspect of this invention, there is provided a method of assembling a clamping device as described in each of the first to fourth aspects of the invention described above, wherein the method comprises inserting the clamping mechanism and the release member into the body through the opening arrangement so that the release member extends through the opening arrangement.

The main opening region may include an elongate slot region and the method may include disposing the release member in the elongate slot region as the clamping mechanism and the release member is received through the main opening region.

The elongate slot region may extend along a side portion of the body. The side portion may be an edge portion of the body.

The clamping device may include a carriage on which the clamping member is carried. The method may comprise arranging the clamping member on the carriage and thereafter inserting the carriage in the body.

The release member may be movable from a secured position to a non-secured position. The clamping member may be released when the release member is in the non-secured position.

The clamping member may be arranged to clamp the elongate article when the release member is in the secured position. The carriage may be movable with the release member between the secured and non-secured positions. The urging member may urge the carriage and the release member to the secured position.

The urging member may be a resilient urging member. The urging member may be a spring, such as a compression spring. The clamping member may comprise a roller. In the case of clamping members in the form of rollers, the clamping member can be more easily released than prior art clamping devices. The use of a roller provides adequate load performance on thinner wires. Alternatively, the clamping member may be any other suitable shape, for example a wedge.

The body may have a guide formation along which the clamping mechanism extends. The internal space may have a first region for receiving the elongate article through the body. The internal space may have a second region in which the clamping mechanism is disposed.

The clamping member may clamp the elongate article between the reaction formation and the guide formation. The reaction formation may comprise an internal first wall of the body. The guide formation may comprise a second wall of the body. The guide formation may taper towards the reaction formation.

The clamping member may be received by the carriage. The carriage may comprise a socket portion for receiving the clamping member. The socket portion may define a cavity in which the clamping member is received. The socket portion may define opposite apertures to provide communication between the cavity and a region external of the cavity.

The socket portion may be provided with a retaining formation to retain the clamping member in the cavity. The retaining formation may comprise an inwardly extending tab which extends from the socket portion into the cavity.

The retaining formation may engage the clamping member at a side of the clamping member. The socket portion may be provided with a pair of opposed retaining formations arranged to engage opposite sides of the clamping member.

The clamping member may extend from the socket portion to engage the body. The clamping member may engage the guide formation. The clamping member may extend through the opposite apertures.

In one embodiment, the clamping member may be separate from the carriage. Alternatively, the clamping member may be integral with the carriage.

The urging member may be separate from the carriage. The carriage may hold the urging member. The method may comprise arranging the urging member in contact with the carriage so that the carriage holds the urging member.

The carriage may comprise a first holding portion for holding the urging member. The first holding portion may define a first holding recess for receiving a first end portion of the urging member. The urging member may extend from the carriage. The method may comprise disposing the urging member on the first holding portion. The method may comprise disposing the urging member in the first holding recess.

The release member may be attached to the carriage. The release member may be integral with the carriage. The release member may be attached to the first holding portion.

The clamping device may comprise a cap member for engaging the urging member. The cap member may be disposed in the main opening region. The cap member may provide a reaction force to the urging member so that the urging member can urge the carriage.

The cap member may have stop portion extending across the main opening region. The cap member may include a second holding portion for holding the urging member. The second holding portion may be attached to the stop portion. The second holding portion may define a second holding recess for receiving one of the end portions of the urging member. The method may comprise arranging the cap portion in the opening arrangement, preferably in the main opening region. The method may comprise arranging the cap portion in the end region of the opening arrangement, desirably in the main opening region.

The method may comprise arranging the urging member in contact with the cap member so that the cap member holds the urging member. The method may comprise disposing the urging member on the second holding portion. The method may comprise disposing the urging member in the second holding recess.

The release member may comprise an engaging member arranged on the outside of the body, the engaging member being engageable by a user for moving the release member from the securing position to the non-securing position. The release member may further include a connecting portion extending from the carriage to the engaging member. The connecting region may be received in the slot region when the clamping mechanism is received through the opening arrangement, desirably through the main opening region.

The engaging member may be wider than the slot region. The engaging member may extend around the body. The engaging member may have a substantially U shaped configuration, having opposite arms. The opposite arms may extend on opposite sides of the connecting portion. The engaging member may receive a region of the body between the opposite arms.

The slot region may be defined in an external wall of the body. The engaging member may extend across said external wall. The engaging member may comprise a raised portion extending proud of the body.

The external wall may be opposite the reaction formation. The external wall may comprise the guide formation. The external wall may have inner and outer surfaces. The slot region may extend through the external wall to provide communication between the internal space and a region external of the clamping device. The slot region may have an open end. The open end may provide communication between each slot region and the respective end region.

The clamping device may comprise two of said clamping mechanisms in the body. Each of said clamping mechanisms may comprise a respective clamping member and a respective urging member for urging the clamping members into clamping engagement with a respective elongate article. The respective elongate articles may be two separate elongate articles or two passes of a single elongate article.

The body may define two of said internal spaces. The body may define two of said exit and feed opening regions, the exit and feed opening regions allowing each elongate article to be received in the respective internal space.

The body may define two of said slot regions. Each slot region may have an open end. Each open end may provide communication between the slot region and the respective main opening region. Each release member may extend outwardly from the body through the respective slot region.

The body may have a single reaction formation to provide a reaction force to the respective elongate article.

The clamping device may comprise two carriages on each of which a respective one of the clamping members may be provided. The clamping device may comprise two of the release members for releasing the respective clamping member from engagement with the respective elongate article. Each release member may extend outwardly from the body.

Each release member may be movable from a secured position to a non-secured position. Each clamping member may be released when the respective release member is in the non-secured position.

Each clamping member may be arranged to clamp the respective elongate article when the release member is in the secured position.

Each carriage may be movable with the release member between the secured and non-secured positions. Each urging member may urge the respective carriage and release member to the secured positions.

Each urging member may be a resilient urging member. Each urging member may be a spring, such as a compression spring.

The body may have two guide formations along which the respective clamping mechanism extends. Each internal space may have a respective first region for receiving the elongate article through the body. Each internal space may have a respective second region in which the respective clamping mechanism is disposed.

Each clamping member may clamp the respective elongate article between the reaction formation and the respective guide formation. Each guide formation may comprise a respective second wall of the body. Each guide formation may taper towards the reaction formation.

Each carriage may receive the respective clamping member. Each carriage may comprise a socket portion for receiving the clamping member. Each socket portion may define a cavity in which the respective clamping member is received.

Each socket portion may define opposite apertures to provide communication between the respective cavity and a region external of the cavity.

Each socket portion may be provided with a retaining formation to retain the respective clamping member in the cavity. Each retaining formation may comprise an inwardly extending tab which extends from the socket portion into the cavity.

Each retaining formation may engage the respective clamping member at a side of the clamping member. Each socket portion may be provided with a pair of opposed retaining formations arranged to engage opposite sides of the respective clamping member.

Each clamping member may extend from the respective socket portion to engage the body. Each clamping member may engage the respective guide formation. Each clamping member may extend through the opposite apertures of the respective socket portion.

Each urging member may be separate from the respective carriage. Each carriage may hold the respective urging member. Each carriage may comprise a respective first holding portion for holding the respective urging member. Each first holding portion may define a first holding recess for receiving an end portion of the respective urging member. Each urging member may extend from the respective carriage.

Each release member may be attached to the respective carriage. Each release member may be integral with the respective carriage. Each release member may be attached to the respective holding portion.

The clamping device may comprise two of the end members, each end member being arranged for engaging a respective one of the urging members. Each end member may be disposed in the respective opening arrangement, desirably in the respective main opening region. Each end member may provide a reaction force to the respective urging member so that the each member can urge the respective carriage.

Each end member may have stop portion extending across the respective opening arrangement, desirably across the respective main opening region. Each end member may include a second holding portion for holding the urging member. The second holding portion of each end member may be attached to the stop portion.

Each release member may comprise a respective engaging member arranged on the outside of the body. Each release member may further include a respective connecting portion extending from the respective carriage to the respective engaging member.

Each engaging member may be wider than the respective slot region. Each engaging member may extend around the body. Each engaging member may have a substantially U shaped configuration, having opposite arms.

The opposite arms of each engaging member may extend on opposite sides of the respective connecting portion. Each engaging member may receive a region of the body between the opposite arms.

Each slot region may be defined in a respective external wall of the body. Each engaging member may extend across said external wall. Each engaging member may comprise a respective raised portion extending proud of the body.

The body may have two external walls opposite the reaction formation. Each external wall may comprise a respective one of the guide formations. Each external wall may have inner and outer surfaces. Each slot region may extend through the respective external wall to provide communication between the internal space and a region external of the clamping device. The open end of each slot region may provide communication between each slot region and the respective end region.

An embodiment of the invention will now be described by way of example only, with reference to the accompanying drawings, in which.

The drawings show a clamping device 10 for clamping elongate articles 100 in the form of cables, wires, wire ropes or the like. The clamping device 10 comprises a body 12 defining two internal spaces 14 through which the elongate article 100 or elongate articles 100 can extend.

Figure 8:
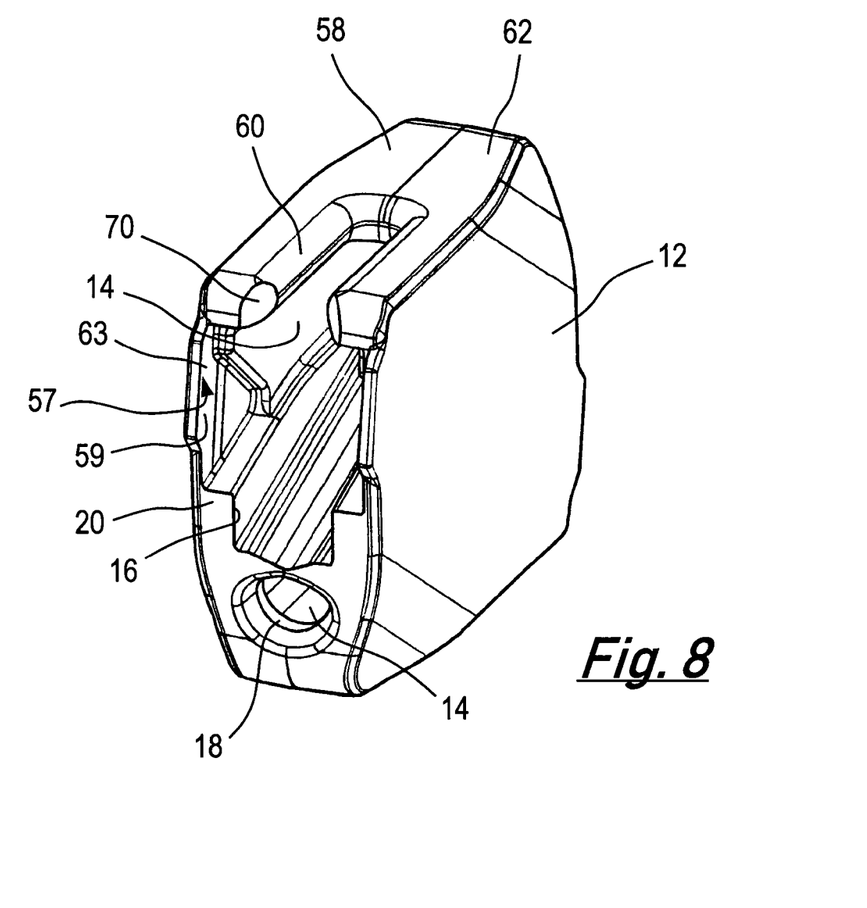
FIG. 8 is a perspective view of a body of the clamping device.
Figure 9:
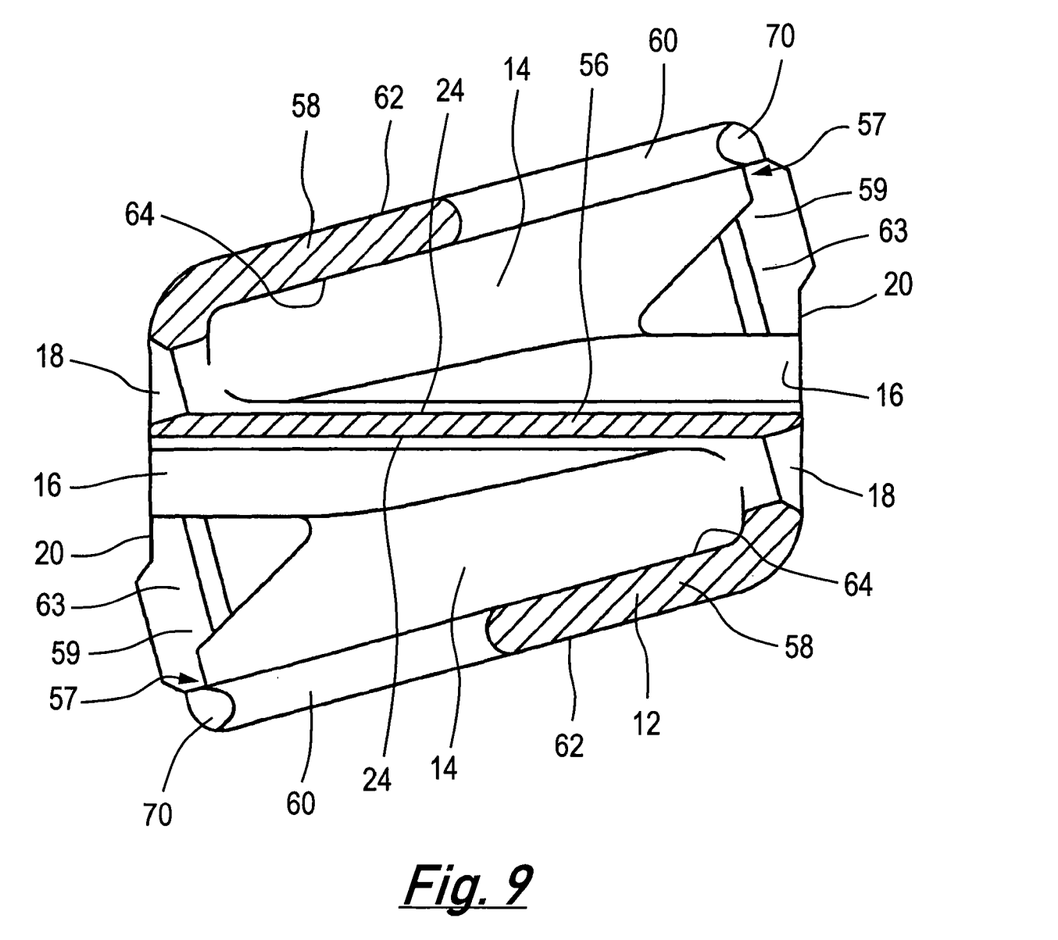
FIG. 9 is a sectional side view of the body shown in FIG. 8.

Referring to FIGS. 8 and 9, the body 12 of the clamping device 10 defines two opening arrangements 57, each of which includes opposite exit and feed opening regions 16, 18 in respective first and second opposite end faces 20 of the body 12. The exit and feed opening regions 16, 18 provide communication with the internal space 14. Opening arrangement 57 further includes a respective main opening region 59 in each of the end faces 20.

The internal space 14 has a channel 24 for the elongate article 100. The channel 24 extends between the exit opening region 16 and the feed opening region 18, each of the exit and feed opening regions 16, 18 being defined in a respective one of the end faces 20.

The exit and feed opening regions 16, 18 provide communication between the internal space 14 and a region external of the clamping device 10. The exit and feed opening regions 16, 18 allow the elongate article 100 to be received in the channel 24. The elongate article is shown in broken lines in FIG. 6.

The clamping device 10 further includes a clamping mechanism 26 comprising a clamping member 28 and an urging member 30. In the embodiment shown, the clamping member 28 is in the form of a roller, but it could be any other suitable shape, for example a wedge. The urging member 30 is in the form of a compression spring.

The clamping mechanism 26 further includes a carriage 32 to carry the clamping member 28. The carriage 32 comprises a socket portion 34 to hold the clamping member 28. The use of a clamping member 28 in the form of a roller provides the advantage of adequate load performance on thinner wires.

The carriage 32 allows the clamping member 28 to be more easily released than in prior art clamping devices, particularly where the clamping member 32 is a roller. The urging member 30 is in the form of a compression spring to apply an urging force on the clamping member 28, as explained in more detail below.

The socket portion 34 defines a cavity 36 in which the clamping member 28 is held. The socket portion 34 further defines opposite apertures 38, 40 to provide communication between the cavity 36 and a region external to the cavity 36.

The clamping mechanism 26 further includes a release member 42 on the carriage 32. The release member 42 extends from the carriage 42 through the body 12 to a region external thereof. In the embodiment shown, the release member 42 is integral with the carriage 32. The carriage 42 provides an effective means for the release member 42 to apply a release force to the clamping member 28.

The carriage 32 comprises a first holding portion 44 defining a first holding recess 46 for holding an end portion of the urging member 30. An end member 48 is provided across a region of each main opening region 59 in the body 12.

The urging member 30 extends between the carriage 32 and the end member 48 so that the end member 48 provides a reaction force to the urging member 30. Thus, each urging member 30 urges the respective carriage 32 and clamping member 28 in the direction indicated by the arrow A in FIGS. 5 and 6.

Each end member 48 comprises a cap member 50 extending across the main opening region 59. Each end member 48 further includes a second holding portion 52 for holding an end of the urging member 30.

The second holding portion 52 is attached to the cap member 50. The second holding portion 52 defines a second holding recess 54 for receiving the opposite end portion of the urging member 30.

The body 12 includes a reaction formation 56 to provide a reaction force on the elongate article 100 when the elongate article 100 is clamped by the clamping member 28. The reaction formation 56 is in the form of an internal wall of the body 12 extending across the centre of the body 12.

The body 12 also includes a guide formation 58 in the form of an external wall of the body 12 opposite the reaction formation 56. The guide formation 58 and the reaction formation 56 taper towards each other. The guide formation 58 is provided along a side portion of the body 12. In the embodiment shown, the guide formation is an edge portion of the body 12.

The guide formation 58 guides the clamping member 28 towards the reaction formation 56 as the carriage 32 is urged by the urging member 30 towards the reaction formation 56. The elongate article 100 is clamped by the clamping member 28 in the narrowing gap between the guide formation 58 and the reaction formation 56.

Each opening arrangement 57 defined by the body 12 further includes a slot region 60 defined in the respective guide formation 58. The release member 42 extends through the slot region 60.

The main opening region 59 of the opening arrangement 57 communicates with the respective exit opening region 16, thereby forming a single end opening 63. Alternatively, a separator may extend between the main opening region 59 of the opening arrangement 57 and the exit opening region 16, thereby forming two separate openings in the end face 20. Each end member 48 is received in the main opening region 59 of the respective opening arrangement 57.

The guide formation 58 has outer and inner opposite surfaces 62, 64 (see FIG. 9). The slot region 60 allows communication between the internal space 14 and a region external of the clamping device 10.

The slot region 60 also has an open end 70 adjacent the main opening region 59 in the body 12 to provide communication between the slot region 60 and the main region opening 57. The open end 70 extends across the slot region 60 from the outer surface 62 to the inner surface 64.

Figure 1:
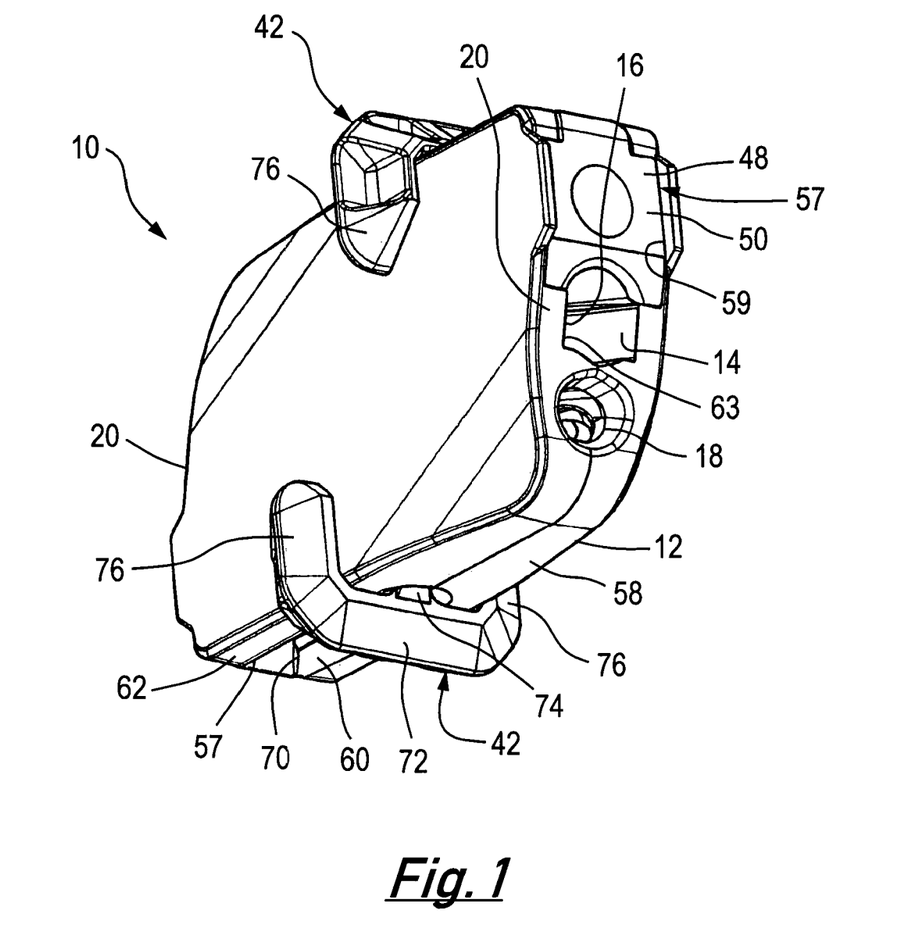
FIG. 1 is a perspective view of a clamping device.
Figure 2:
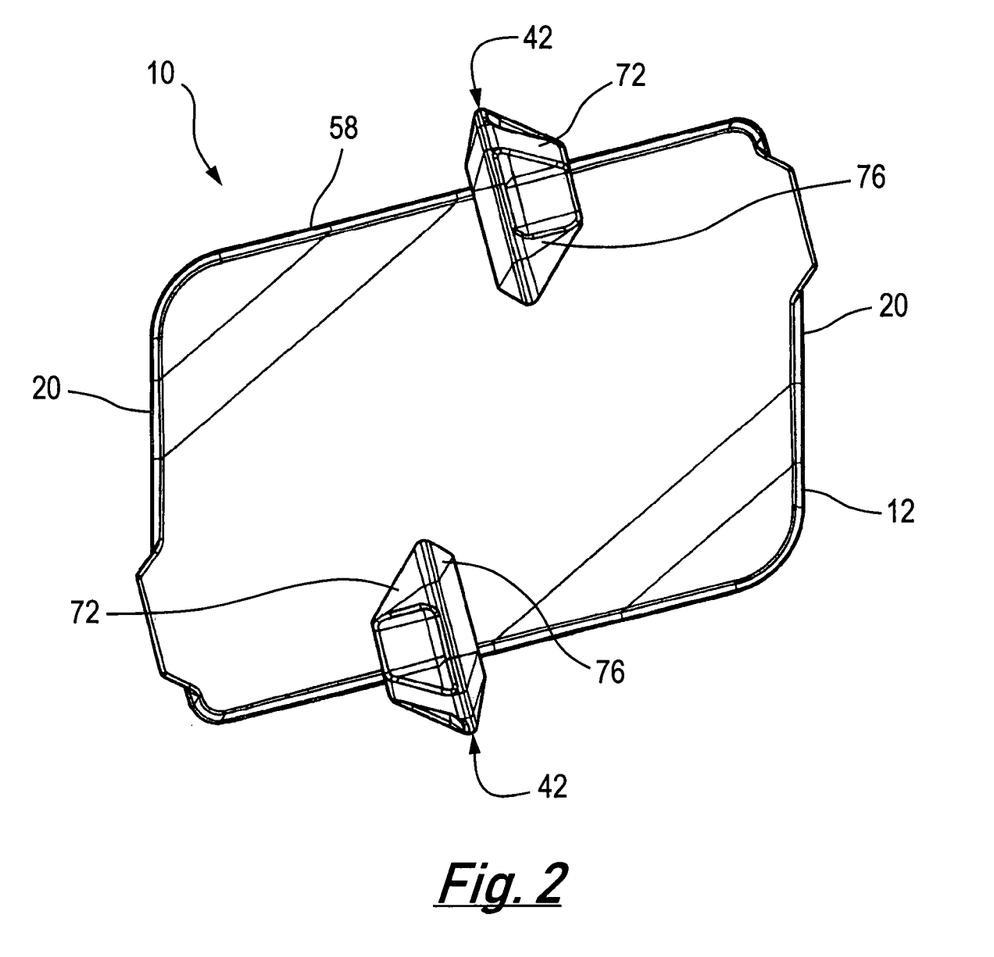
FIG. 2 is a side view of the clamping device.
Figure 3:
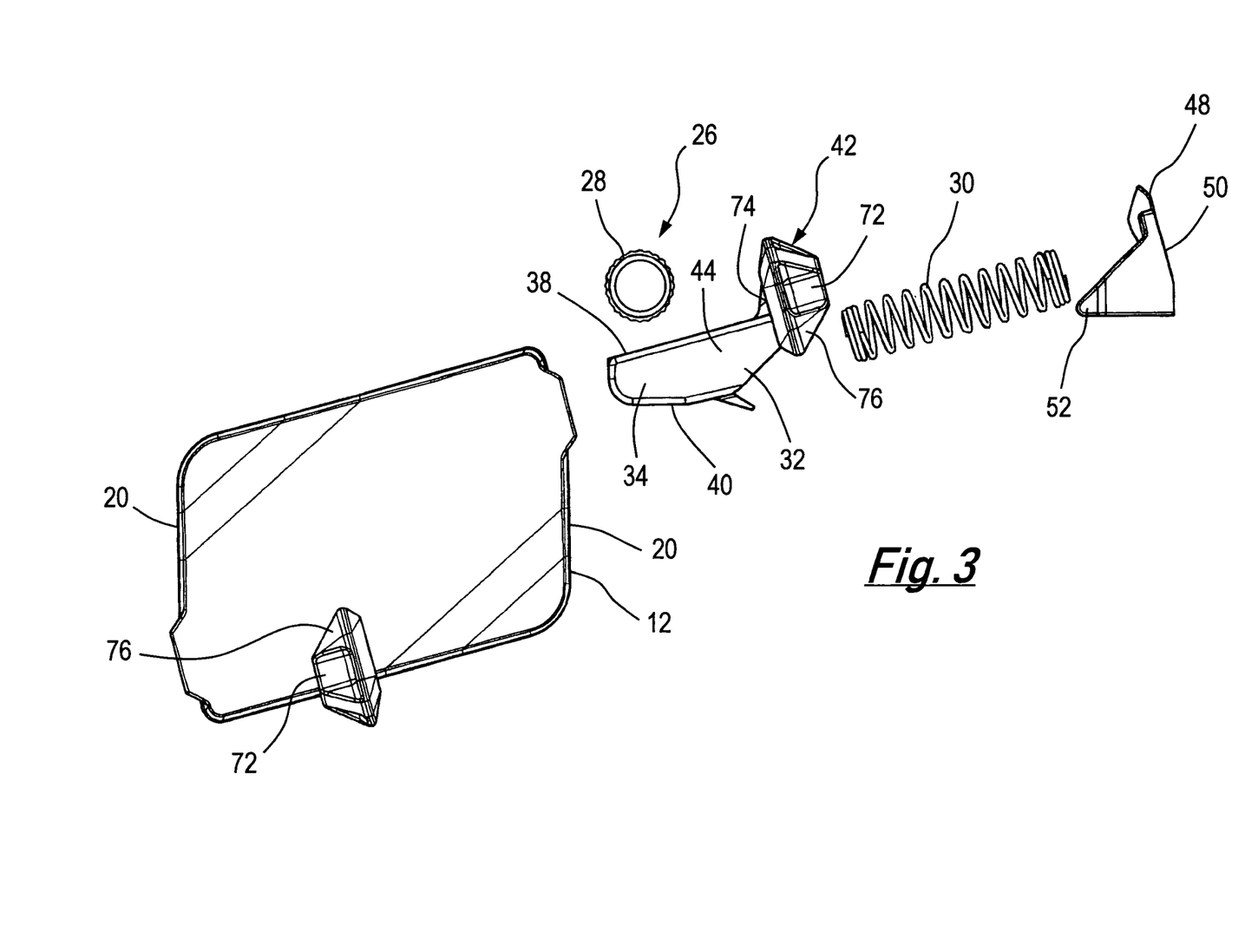
FIG. 3 is an exploded side view of the clamping device
Figure 4:
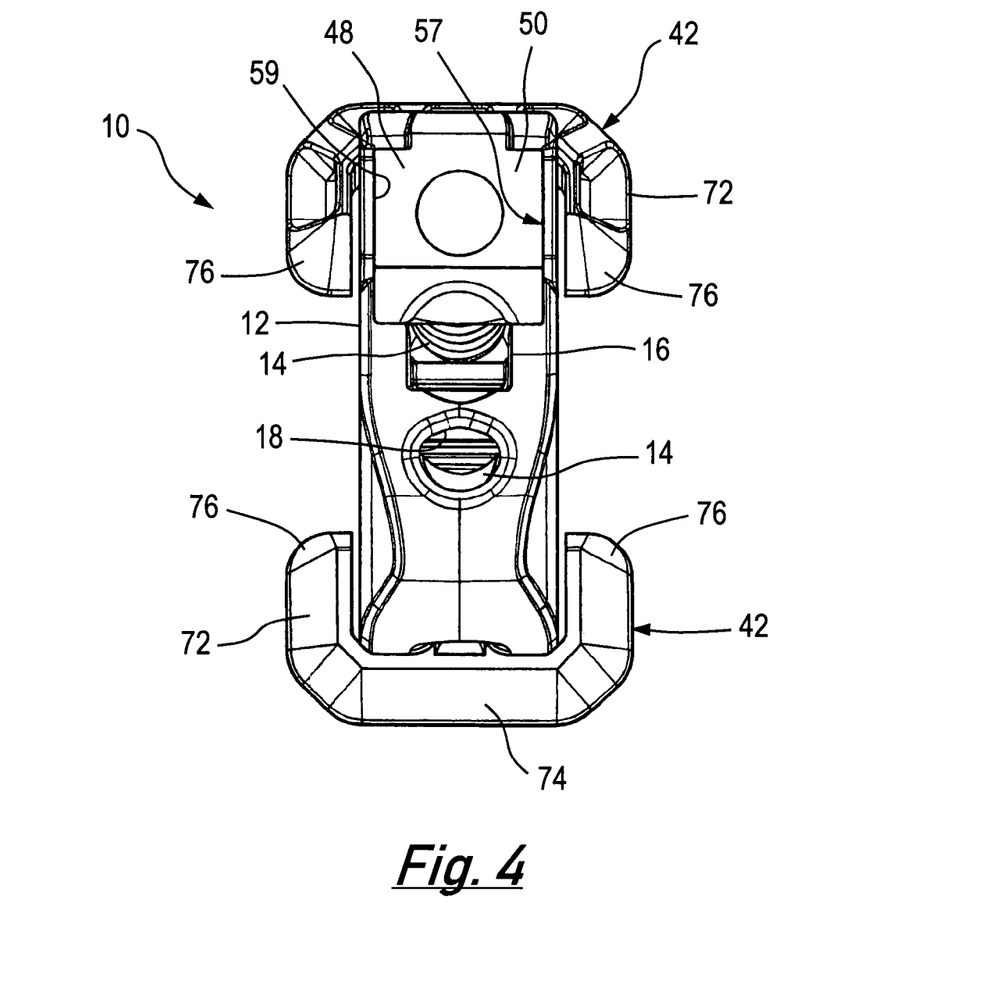
FIG. 4 is a front view of the clamping device.
Figure 5:
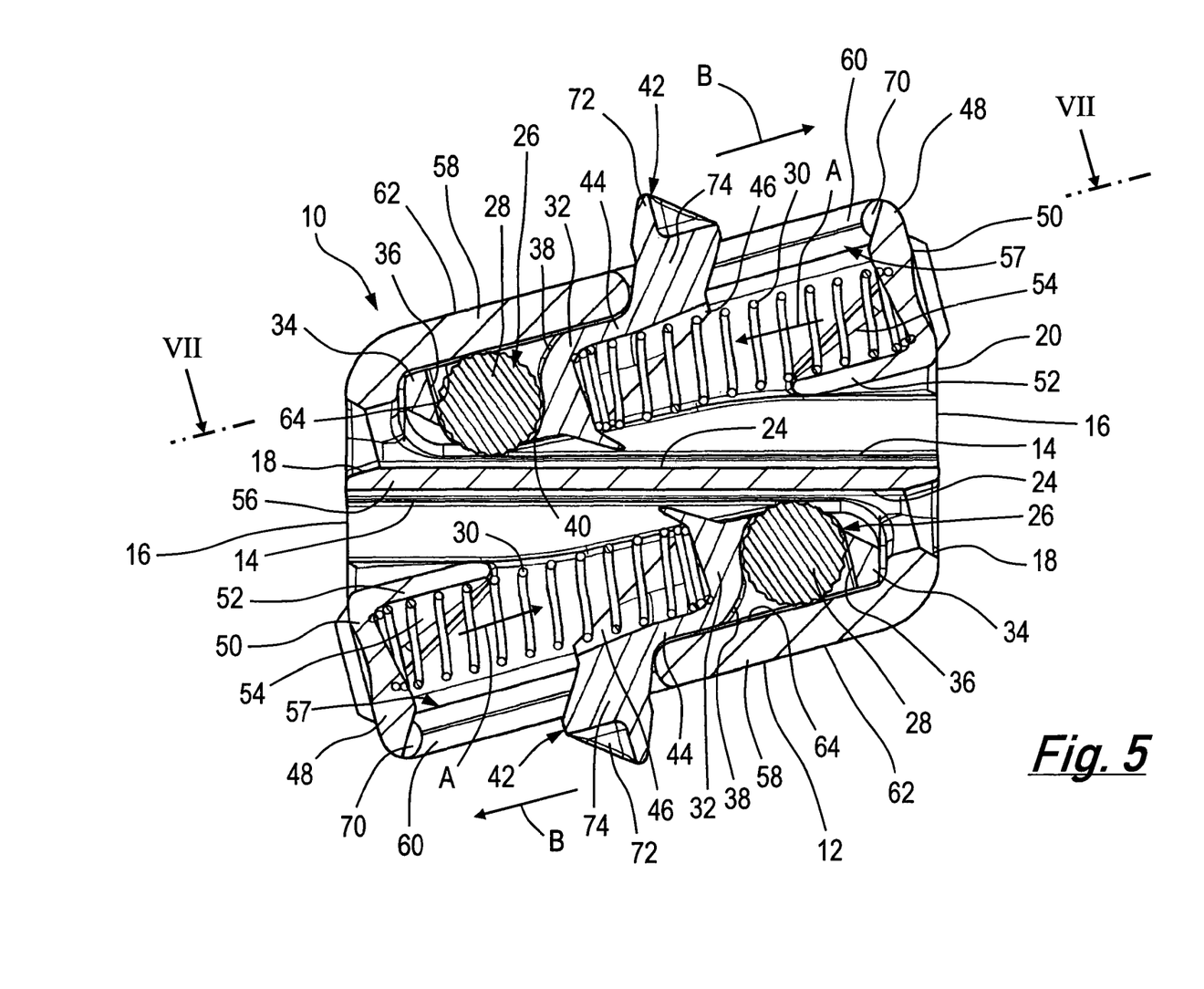
FIG. 5 is a sectional view of the clamping device showing a clamping member in a clamping position.
Figure 6:
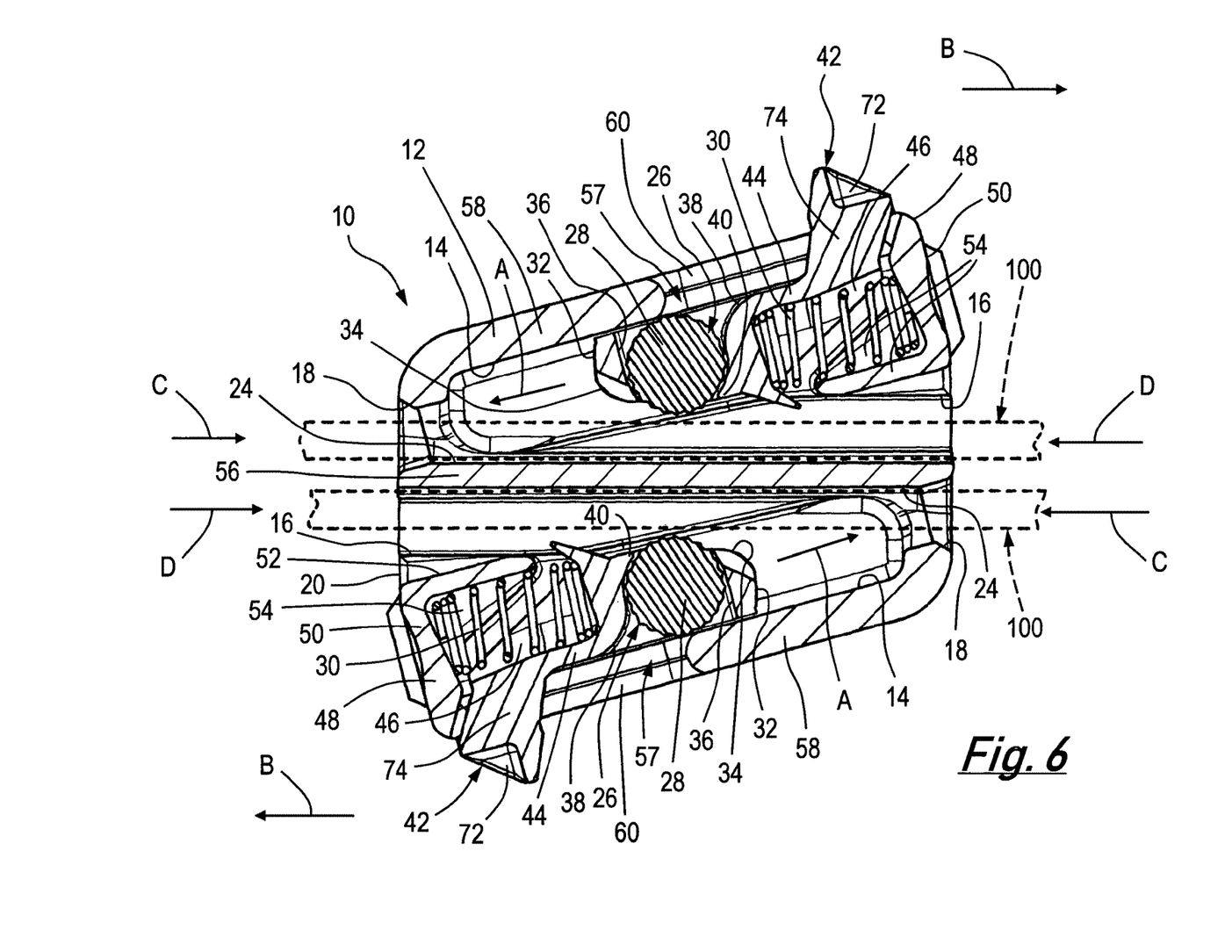
FIG. 6 is a sectional view of the clamping device showing the clamping member in a release position.

The release member 42 and the carriage 32 are movable along the slot region 60 by a user between a secured position, shown in FIG. 5, and a non-secured position, shown in FIG. 6. Movement of the release member 42 between the non-secured and secured positions moves the clamping member 28 between a release position, shown in FIG. 5, and a clamping position, shown in FIG. 6.

Movement of the clamping member 28 to the clamping position, moves the clamping member 28 into clamping engagement with the elongate article 100. This causes the clamping member 28 to clamp the elongate article 100 in the narrowing gap between the reaction formation 56 and the guide formation 58.

When the release member 42 is moved to the non-secured position, the clamping member 28 is moved along the guide formation 58 away from the clamping position to the release position, and is thereby released from the elongate article 100. This allows the clamping device 10 to be moved along the elongate article 100.

When the clamping member 28 is in the clamping position, the release member 42 is in a secured position. When the clamping member 28 is in the release position, the release member is in the non-secured position.

In the secured position of the release member 42, the release member 42 is secured relative to the body 12 by the clamping member 28 being in clamping engagement with the elongate article 100.

The release member 42 comprises a substantially U shaped engaging member 72 and a connecting member 74. The U shaped engaging member 72 comprises two arms 76 which extend on opposite sides of the connecting member 74 around the body 12, so that a region of the body 12 is received between the arms 76.

The connecting member 74 connects the engaging member 72 to the carriage 32. The engaging member 72 can be engaged by a user to move the release member 42 along the slot region 60 in the direction of the arrow B in FIGS. 5 and 6, thereby moving the carriage 32 and the clamping member 28 in the same direction to the release position.

In use, a user inserts an elongate article 100 into the body 12 via the feed opening region 18, as shown by the arrow C in FIG. 6. The elongate article 100 engages the clamping member 28, pushing the clamping member 28 against the urging force of the urging member 30 towards the release positions of the clamping member 28 and the carriage 32. This allows the elongate article 100 to be pushed through the body 12 out of the exit opening region 16, so that the elongate article 100 extends out of the body 12 from both of the exit and feed opening regions 16, 18.

The elongate article 100 is then threaded through the body 12 until the clamping device 10 is arranged at the desired position along the elongate article 100. The elongate article 100 can then by secured to the clamping device 10 by pulling the elongate article 100 in the opposite direction through the body 12, indicated by the arrow D in FIG. 6.

The clamping member 28 and the carriage 32 is pulled by the elongate article 100 in the direction of the arrow A in FIGS. 5 and 6. Thus, the clamping member 28 is pulled into the decreasing gap between the tapering reaction and guide formations 56, 58, thereby clamping the elongate article 100.

If it is desired to adjust the position of the clamping device 10 along the elongate member, the user can engage the engaging portion of the release member 42, for example, with his or her thumb, and then pushing the release member 42 along the slot region 60 in the direction indicated by the arrow B in FIGS. 5 and 6. This moves the carriage 32 and the clamping member 28 to the release position, thereby allowing the clamping device 10 to be moved to another position along the elongate article 100.

When the clamping device 10 is in the desired position, the elongate article 100 can then be pulled in the direction of the arrow D in FIG. 6, thereby pulling the clamping member 28 into the narrowing gap between the reaction and guide formations 56, 58 to clamp the elongate article 100 again.

The drawings show that the clamping device 10 can clamp two elongate articles 100 in opposite half portions of the body 12. The body 12 therefore houses two sets of the features discussed in the above passages of the specific description, with the exception of the reaction formation 56.

A single reaction formation 56 is provided separating the two portions of the body 12, the single reaction formation 56 constituting the reaction formation 56 for each portion of the body 12.

Assembly of the clamping device 10 is carried out as follows. The clamping members 28 are disposed in the socket portions 34 of the respective carriages 32. The urging members 30 are received in the first holding recesses 46 of the respective carriages 32.

Each of the carriages 32, with the clamping members 28 and the urging members 30 therein, is inserted into the body 12 via the end region 59 of a respective one of the opening arrangements 57. When the carriages 32 are so inserted, the connecting members 74 are received in the slot regions 60 via the open ends 70 thereof.

The cap members 50 are then inserted into the main opening regions 59 of the respective opening arrangements 57, thereby closing the end regions 59, and providing reaction surfaces for the urging members 30.

The provision of the main opening region 59 and the slot region 60 at the same end as the exit opening region 16 provides the advantage in the embodiment described herein that the release member 42 and the clamping mechanism 26 can be assembled into the body 12 from the same end of the body 12. This overcomes the problem discussed above associated with the prior art, such as the device disclosed in GB2471773.

There is thus described a clamping device 10 which includes a carriage 32 for carrying the clamping member 28 and a release member 42 that can move the carriage 32 to the release position. The use of the carriage 32 ensures that the movement of the clamping member 28, either to the clamping position or to the release position, is more controllable than clamping devices without carriages.

In addition, the release member 42 operates on the carriage 32 at the same end of the body 12 as the clamping mechanism 26, thereby avoiding need to move the release member 42 through the body 12 from the opposite end. This avoids the movement of the release member 42 being inhibited by obstructions in the body 12.

The open end of the slot region 60 allows installation of a carriage 32 having a release member 42 with an engaging member 72 that is wider than the slot region 60.

Figure 7:
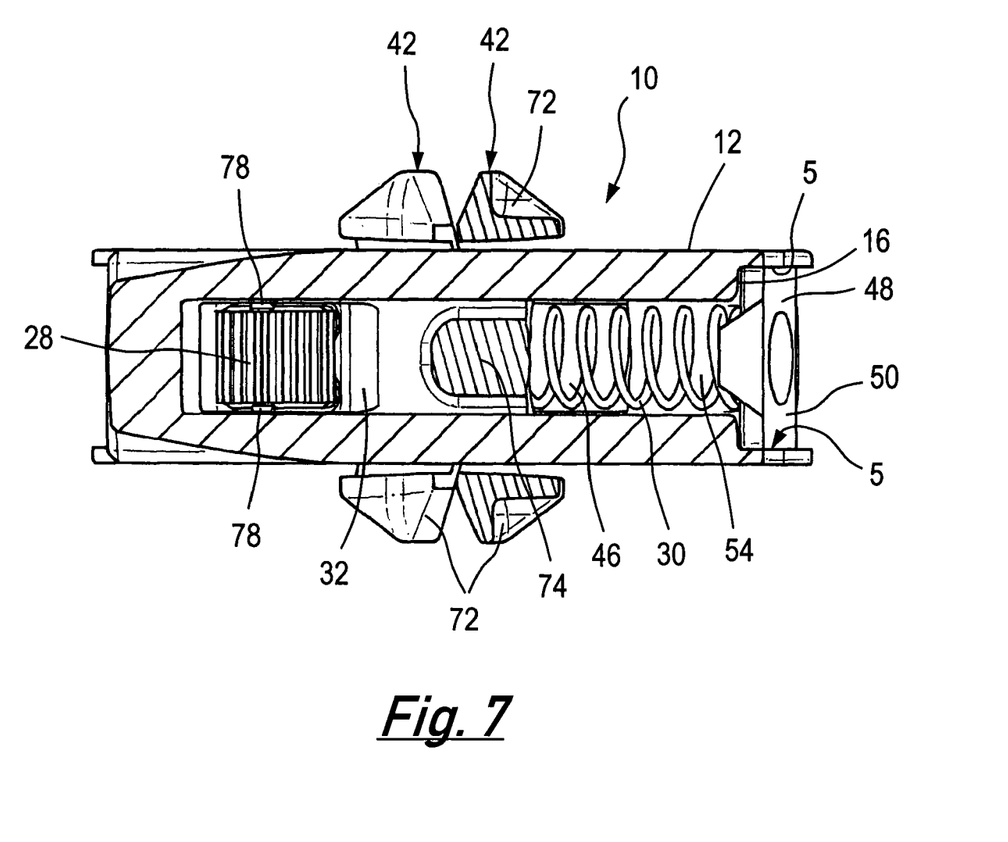
FIG. 7 is a cross sectional view of the clamping device along the lines VII-VII in FIG. 5.

Referring to FIG. 7, the socket portion 34 of the carriage 32 is provided with inwardly extending opposed retaining formations 78 in the form of tabs. The retaining formations 78 extend from the socket portion 34 into the cavity 36.

The retaining formations 78 engage the clamping member 28 when the clamping member 28 is inserted into the cavity 36. The clamping member 28 has opposite sides 28A, which the retaining formations 78 engage. The retaining formations 78 retain the clamping member 28 in the cavity 36 during assembly of the clamping mechanism 26.

There is thus described a clamping device 10 in which the clamping member 28 is held within a carriage 32, and in which a release member 42 extends from the carriage 32. The provision of the main opening region 59 and the slot region 60 at the same end allows the clamping mechanism 26 and the release member 42 to be assembled into the body 12 via the same end.

The ability to arrangement the clamping member 28 within the carriage 32 before assembly means that there is a manufacturing advantage compared to prior art devices.

Various modifications can be made without departing from the scope of the invention. For example, the urging member could be another suitable spring capable of applying an urging force to the clamping member. In other modifications, the clamping member 28 may be integral with the carriage 32. In addition, the release member 42 may be separate from the carriage 32 and attached thereto. In a further modification, the first opening 16 and the opening arrangement 57 may be separate openings having a separating member extending between the first opening 16 and the opening arrangement 57.

The invention claimed is:

1. A clamping device for clamping an elongate article, the clamping device comprising:
 a body defining an internal space through which the elongate article can extend;
 a clamping mechanism in the internal space, the clamping mechanism comprising a clamping member and an urging member for urging the clamping member into clamping engagement with the elongate article;
 the body having a reaction formation along which the elongate article can extend, the reaction formation being for applying a reaction force to the elongate article when so engaged by the clamping member;
 the clamping device further includes a release member for releasing the clamping member from engagement with the elongate article; and wherein the body defines an opening arrangement, the opening arrangement being configured to receive the clamping mechanism and the release member therethrough into the internal space;

wherein the clamping device includes a carriage on which the clamping member is carried, the release member being attached to the carriage, wherein the carriage is received through the opening arrangement when the clamping mechanism is received therethrough; and wherein the carriage comprises a socket portion for receiving the clamping member, the socket portion defining a cavity in which the clamping member is received.

2. A clamping device according to claim 1, wherein the opening arrangement has a main opening region defined by the body, the main opening region being configured to receive the clamping mechanism therethrough into the internal space, and wherein the opening arrangement has a slot region defined by the body, the release member extending through the slot region.

3. A clamping device according to claim 2, wherein the main opening region and the slot region communicate with each other to allow the release member to be received in the slot region when the release member is received through the opening arrangement.

4. A clamping device according to claim 2, wherein the opening arrangement has an exit opening region through which the elongate article can exit when the elongate article is fed into the internal space, and the body defines a feed opening region through which the elongate article can be fed when the elongate article is fed into the internal space, the exit opening region and the main opening region communicating with each other, so that the main opening region and the exit opening region are together a single opening.

5. A clamping device according to claim 1, wherein the body has a guide formation along which the clamping mechanism extends, the internal space having a first region for receiving the elongate article through the body, and the internal space having a second region in which the clamping mechanism is disposed.

6. A clamping device according to claim 1, wherein the carriage comprises a first holding portion for holding the urging member, the first holding portion defining a first holding recess for receiving a first end portion of the urging member.

7. A clamping device according to claim 1, comprising an end member for engaging the urging member, the end member being arranged to provide a reaction force to the urging member so that the urging member can urge the carriage, the end member being disposed in the first opening.

8. A clamping device according to claim 7, wherein the end member has a stop portion extending across the first opening, the end member further including a second holding portion for holding the urging member.

9. A clamping device according to claim 8, wherein the second holding portion defines a second holding recess for receiving one of the end portions of the urging member.

10. A clamping device according to claim 1, wherein the release member comprises an engaging member arranged on the outside of the body, and the release member further includes a connecting portion extending from the carriage to the engaging member.

11. A clamping device according to claim 10, wherein the engaging member has a substantially U shaped configuration, having opposite arms, the opposite arms extending on opposite sides of the connecting portion, and the engaging member receiving a region of the body between the opposite arms.

12. A clamping device according to claim 10, wherein the slot is defined in an external wall of the body, and the engaging member extends across said external wall, the external wall being opposite the reaction formation.

13. A clamping device according to claim 1, wherein the release member extends through the opening arrangement, and the release member is movable from a secured position to a released position, whereby the clamping member is arranged to clamp the elongate article when the release member is in the secured position, and whereby the clamping member is released when the release member is in the released position, the carriage being movable with the release member between the secured and released positions, and wherein the urging member urges the carriage and the release member to the secured position.

14. A clamping device according to claim 1, wherein the body has a guide formation along which the clamping mechanism extends, and the socket portion defines opposite apertures to provide communication between the cavity and a region external of the cavity, the clamping member extending through the opposite apertures to engage the elongate article and the guide formation.

15. A clamping device according to claim 14, wherein the socket portion is provided with a retaining formation to retain the clamping member in the cavity, the retaining formation engaging the clamping member at a side of the clamping member, and the clamping member extending from the socket portion to engage the body.

16. A method of assembling a clamping device as claimed in claim 1, wherein the method comprises inserting the clamping mechanism into the body through the opening arrangement so that the release member extends through the opening arrangement.

17. A method according to claim 16, wherein the opening arrangement includes a main opening region and an elongate slot region, and the method includes disposing the release member in the elongate slot region as the clamping mechanism is received through the main opening region.

18. A clamping device for clamping an elongate article, the clamping device comprising:
a body;
a clamping mechanism in the body, the clamping mechanism comprising a clamping member and an urging member for urging the clamping member into clamping engagement with the elongate article;
the body having a reaction formation along which the elongate article can extend, the reaction formation being for applying a reaction force to the elongate article when so engaged by the clamping member;
a carriage on which the clamping member is carried, the carriage being movable relative to the body; and
a release member attached to the carriage for releasing the clamping member from engagement with the elongate article, the release member extending outwardly from the body;
wherein the release member comprises an engaging member arranged on the outside of the body, the engaging member having a substantially U shaped configuration, and the engaging member having opposite arms.

19. A clamping device for clamping an elongate article, the clamping device comprising:
a body defining an internal space through which the elongate article can extend;

a clamping mechanism in the internal space, the clamping mechanism comprising a clamping member and an urging member for urging the clamping member into clamping engagement with the elongate article;

the body having a reaction formation along which the elongate article can extend, the reaction formation being for applying a reaction force to the elongate article when so engaged by the clamping member;

the clamping device further includes a release member for releasing the clamping member from engagement with the elongate article; and wherein the body defines an opening arrangement, the opening arrangement being configured to receive the clamping mechanism and the release member therethrough into the internal space;

wherein the clamping device includes a carriage on which the clamping member is carried, the release member being attached to the carriage, wherein the carriage is received through the opening arrangement when the clamping mechanism is received therethrough;

wherein the carriage comprises a first holding portion for holding the urging member, the first holding portion defining a first holding recess for receiving a first end portion of the urging member.

* * * * *